(12) United States Patent
Sull et al.

(10) Patent No.: US 9,672,430 B2
(45) Date of Patent: Jun. 6, 2017

(54) METHOD AND APPARATUS FOR DETECTING LANE OF ROAD

(71) Applicant: Korea University Research and Business Foundation, Seoul (KR)

(72) Inventors: Sanghoon Sull, Seoul (KR); Soonhong Jung, Kyunggi-Do (KR); Junsic Youn, Seoul (KR)

(73) Assignee: Korea University Research and Business Foundation, Seoul (KR)

( * ) Notice: Subject to any disclaimer, the term of this patent is extended or adjusted under 35 U.S.C. 154(b) by 69 days.

(21) Appl. No.: 14/824,597

(22) Filed: Aug. 12, 2015

(65) Prior Publication Data

US 2016/0048733 A1    Feb. 18, 2016

(30) Foreign Application Priority Data

Aug. 13, 2014 (KR) .................. 10-2014-0105185

(51) Int. Cl.
| | | |
|---|---|---|
| *G06K 9/00* | (2006.01) | |
| *G06T 3/00* | (2006.01) | |
| *G06K 9/46* | (2006.01) | |
| *G06K 9/32* | (2006.01) | |

(52) U.S. Cl.
CPC ........ *G06K 9/00798* (2013.01); *G06T 3/0093* (2013.01); *G06K 9/4633* (2013.01); *G06K 2009/3291* (2013.01)

(58) Field of Classification Search
CPC ........... G06K 9/00791; G06K 9/00798; G06K 9/4633; G08G 1/167; G06T 7/0022; G06T 7/0028; G06T 7/0042; G06T 2207/30256; G06T 7/33; G06T 7/73; G06T 7/97
See application file for complete search history.

(56) References Cited

U.S. PATENT DOCUMENTS

| | | | |
|---|---|---|---|
| 2011/0170744 A1* | 7/2011 | Malinovskiy et al. | ....... 382/103 |
| 2015/0344031 A1* | 12/2015 | Weisswange | ......... B60W 30/14 701/1 |

FOREIGN PATENT DOCUMENTS

| | | |
|---|---|---|
| JP | 11345392 A | 12/1999 |
| JP | 2008043056 A | 2/2008 |
| JP | 2009131067 A | 6/2009 |
| JP | 2010205041 A | 9/2010 |

* cited by examiner

*Primary Examiner* — Andrew W Johns
(74) *Attorney, Agent, or Firm* — Fox Rothschild LLP

(57) ABSTRACT

A method for detecting lanes on the road is disclosed. The method including: a phase that generates at least one spatiotemporal image by storing along the time axis at least one line image that contains pixels corresponding to at least one horizontal line established in a road video; a phase that detects, in lane patterns contained in each of the at least one spatiotemporal image, two or more lane points that correspond to the present moment; and a phase that detects lanes by tracing the two or more lane points over time in each of the at least one spatiotemporal image.

23 Claims, 14 Drawing Sheets

METHOD AND APPARATUS FOR DETECTING LANE OF ROAD

CROSS-REFERENCE TO RELATED PATENT APPLICATION

This application claims the benefit of Korean Patent Application No. 10-2014-0105185, filed on Aug. 13, 2014, in the Korean Intellectual Property Office, the disclosure of which is incorporated herein in its entirety by reference.

BACKGROUND OF THE INVENTION

Field of the Invention

The present disclosure relates to detecting lanes. More particularly, the present disclosure relates to a method for detecting lanes on roads based on video analyses and an apparatus thereof.

Description of the Related Art

Intelligent driving assistance systems such as lane departure warning and road sign recognition have been extensively distributed recently on the basis of effective driving lane detection technology. Existing lane detection techniques may be prone to fail to trace driving lanes in the presence of a noise that is similar to a driving lane or when a lane has been effaced. In this regard, detecting methods come to the forefront that clearly identify a lane even when there exists a noise that looks similar to a lane or a lane has been effaced.

SUMMARY OF THE INVENTION

To achieve the objectives, the present disclosure provides a method for detecting lanes. The methods involve: generating at least one spatiotemporal image by storing along the time axis at least one line image that contains pixels corresponding to at least one horizontal line established in a road video; detecting, in lane patterns contained in each of the at least one spatiotemporal image, two or more lane points that correspond to the present moment; and detecting lanes by tracing the two or more lane points over time in each of the at least one spatiotemporal image.

In some scenarios, the spatiotemporal image is generated by consecutively combining the line images in the order of storage over time and in the first direction. The spatiotemporal image may comprise two or more line images extracted from the image frames within a predetermined period of time among two or more image frames that constitute the video.

In those or other scenarios, the two or more lane points are detected by: generating at least one corrected spatiotemporal image by correcting, or linearizing, the lane patterns contained in each of the at least one spatiotemporal image; and detecting, in the linearized lane patterns contained in each of the at least one corrected spatiotemporal image, two or more lane points that correspond to the present moment. The at least one corrected spatiotemporal image generation may correct or linearize the lane patterns contained in the spatiotemporal image by motion-correcting adjacent line images among the two or more line images that constitute the spatiotemporal image.

The generating at least one corrected spatiotemporal image may execute the motion correction according to Equations 1 and 2 as follows:

$$I_{ST}(x, t) = I(x, y_k, t); \text{ and} \quad [\text{Equation 1}]$$

$$R(t) = R(t-1) + \operatorname*{argmin}_{k \in [-\frac{X}{10}, \frac{X}{10}]} \frac{1}{X - |k|} \left( \sum_{x=0}^{X} |I_{ST}(x, t) - I_{ST}(x - k, t - 1)| \right), \quad [\text{Equation 2}]$$

where x denotes the x coordinate of a pixel in a spatiotemporal image, $y_k$ denotes that the y coordinate of a pixel in a spatiotemporal image is fixed to a value $y_k$, $I_{ST}$ denotes a spatiotemporal image when $y=y_k$, R(t) denotes the change in horizontal motion from the current image frame to the previous image frame, X denotes the horizontal width of the spatiotemporal image, and k denotes the displacement along the horizontal axis.

Detecting in the linearized lane patterns two or more lane points that correspond to the present moment may include: converting the corrected spatiotemporal image to a binarized image; Hough transforming the binarized image and detecting straight lines that correspond to the lane patterns; and detecting, among the pixels contained in the straight lines thus detected, pixels, as equivalents of the two or more lane points, that correspond to the present moment. The Hough transforming the binarized image and detecting straight lines that correspond to the lane patterns may detect, when Hough transforming, only the straight lines the angle of which ranges from 80 to 100 degrees.

The detecting, among the pixels contained in the straight lines thus detected, pixels that correspond to the present moment and are equivalent to the two or more lane points may detect, among the pixels that correspond to the present moment, two pixels that are most proximate to the center of the corrected spatiotemporal image in the second direction as equivalents of the two or more lane points.

The detecting the lanes may detects the lanes by tracing the coordinates of the lane points and the distance between the lane points.

The detecting the lanes may include: determining whether there exists in the lane points a lane point that is untraceable; establishing, if it is determined that there exists in the lane points a lane point that is untraceable, a point in the lane points that is positioned at the same distance as that between the lane points from the first lane point that is traceable in the lane points as the second lane point; and detecting the lanes by tracing the first lane point and the second lane point and the distance between the lane points.

To achieve the objectives, the present disclosure also provides an apparatus for detecting lanes, including: a spatiotemporal image generator that generates at least one spatiotemporal image by storing along the time axis at least one line image that contains pixels corresponding to at least one horizontal line established in a road video; a point detector that detects, in lane patterns contained in each of the at least one spatiotemporal image, two or more lane points that correspond to the present moment; and a lane detector that detects lanes by tracing the two or more lane points over time in each of the at least one spatiotemporal image.

In some scenarios, the point detector includes: a corrector that generates at least one corrected spatiotemporal image by linearizing the lane patterns contained in each of the at least one spatiotemporal image; and a point processor that detects, in the linearized lane patterns contained in each of the at least one corrected spatiotemporal image, two or more lane points that correspond to the present moment.

In those or other scenarios, the point processor includes: a binarizer that converts the corrected spatiotemporal image to a binarized image; a Hough transformer that Hough transforms the binarized image and detects straight lines that correspond to the lane patterns; and a point processor detects, among the pixels contained in the straight lines thus detected, pixels, as equivalents of the two or more lane points, that correspond to the present moment.

The lane detector includes: a determiner that determines whether there exists in the lane points a lane point that is untraceable; an establisher that establishes, if it is determined that there exists in the lane points a lane point that is untraceable, a point in the lane points that is positioned at the same distance as that between the lane points from the first lane point that is traceable in the lane points as the second lane point; and a lane processor that detects the lanes by tracing the first lane point and the second lane point and the distance between the lane points.

To achieve the objectives, the present disclosure further provides a method for detecting lanes. The method includes: generating at least one spatiotemporal image by storing along the time axis at least one line image that contains pixels corresponding to at least one horizontal line established in a road video; generating at least one corrected spatiotemporal image by correcting, or linearizing, the lane patterns contained in each of the at least one spatiotemporal image; detecting two straight lines that correspond to the lane patterns in the at least one corrected spatiotemporal image; detecting the first and second candidate pixels that correspond to the connected groups of the pixels which have the pixel values within a predetermined range and are located within a predetermined distance from the two straight lines, respectively; detecting as the two or more lane points from the intersection points between the line image corresponding to the present moment and the two straight lines and pixels, among the first and second candidate pixels, belonging to the line image corresponding to the present moment; and detecting lanes by tracing the two or more lane points over time in each of the at least one spatiotemporal image.

In some scenarios, the generating at least one spatiotemporal image may generates the spatiotemporal image by consecutively combining the line images in the order of storage over time and in the first direction. The spatiotemporal image may comprise two or more line images extracted from the image frames within a predetermined period of time among two or more image frames that constitute the video.

The generating at least one corrected spatiotemporal image may executes the motion correction according to Equation 3 as follows:

$$O(t) = \underset{k \in [-w_R, w_R]}{\operatorname{argmin}} SAD(k, t), \quad \text{[Equation 3]}$$

where O(t) denotes the change in horizontal movement from the current image frame to the previous image frame; k denotes the displacement along the horizontal axis from −wR to wR; and SAD(k, t) denotes the sum of absolute differences of the pixel values or gradient values in the consecutive line images between t and t−1 when the line image at t translates by k with reference to the line image at t−1.

The detecting as the two or more lane points, if the first and second candidate pixels are detected, may detect as lane points the pixels that correspond to the center of pixels from each of the first and second candidate pixels, belonging to the line image corresponding to the present moment and if at least one of the first and second candidate pixels is not detected, may detect as at least one lane point the intersection point between the line image corresponding to the present moment and at least of the two straight lines.

The detecting the first and second candidate pixels may further comprise: excluding, among the first and second candidate pixels thus detected, the pixels which have pixel values different from pixel values of the pixels that correspond to the lane patterns in a previous image frame that corresponds to just before the present moment from the first and second candidate pixels.

The first and second candidate pixels may further comprise: detecting the first and second candidate pixels that correspond to the connected groups of the pixels which have the pixel values within a predetermined range and are located within a predetermined distance from the two straight lines, respectively, only if the number of the pixels in the said group is larger than or equal to a threshold value.

The another embodiment according to the present invention of a method for detecting lanes may further comprise: converting the said corrected spatiotemporal image to a binarized image; and wherein in the detecting two straight lines that correspond to the lane patterns in the at least one corrected spatiotemporal image may include: Hough transforming the said binarized image and detecting two straight lines that correspond to the lane patterns in the at least one corrected spatiotemporal image; and detecting the first and second candidate pixels that correspond to the connected groups of the white pixels which are located within a predetermined distance from the two straight lines, respectively.

provide an illustration that is useful for understanding an exemplary method for detecting lanes applied to a case of existence of a speed bump.

FIGS. 13a, 13b, 13c, 13d, 13e, 13f and 13g (collectively referred to as FIG. 13) provide an illustration that is useful for understanding an exemplary method for detecting lanes applied to a case of existence of a light rise.

Figure 14A:
Figure 14B:
Figure 14C:

FIGS. 14a, 14b and 14c (collectively referred to as FIG. 14) provide an illustration that is useful for understanding an exemplary method for detecting lanes applied to a case of a lane effaced.

FIGS. 15a, 15b, 15c, 15d and 15e (collectively referred to as FIG. 15) provide an illustration that is useful for understanding an exemplary method for detecting lanes applied to a case that an obstacle appears ahead.

Figure 16:
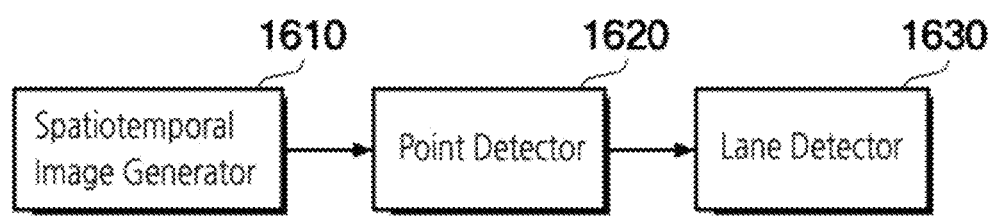

FIG. 16 is a schematic diagram that describes an apparatus for detecting lanes.

Figure 17:
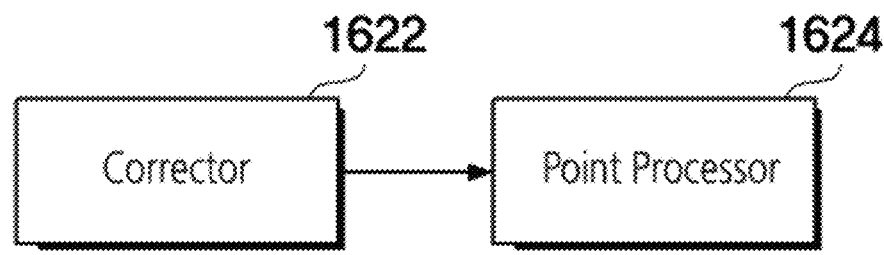

FIG. 17 is a schematic diagram that describes a point detector.

Figure 18:
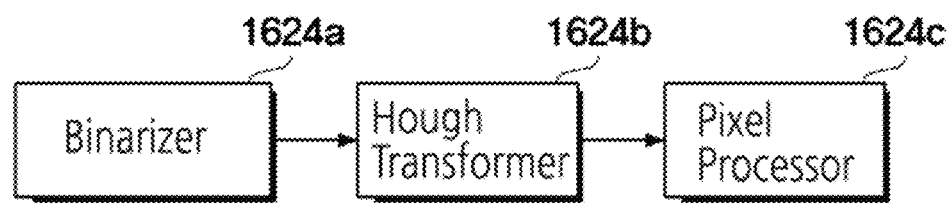

FIG. 18 is a schematic diagram that describes a point processor.

Figure 19:
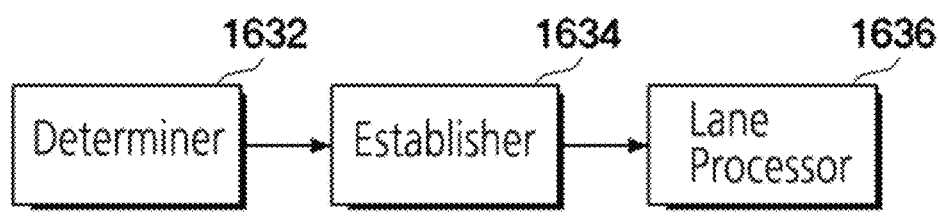

FIG. 19 is a schematic diagram that describes a lane detector.

DETAILED DESCRIPTION OF THE INVENTION

Since the present invention may have various modifications and embodiments, the present invention is now described below in detail in connection with specific embodiments and accompanying drawings. However, it does not intend to limit the present invention to specific embodiments and must be acknowledged that the embodiments should include all the modifications, equivalents and substitutes within the technical thoughts and scope of the present invention. Reference numerals similar to each other are used to denote subject matters also similar to each other in the accompanying drawings.

Terms such as first, second, A, B, etc. may be used to denote various subject matters but the subject matter must not be restricted by means of the terms. Such terms are used in order only to differentiate a subject matter from other subject matters. For example, not deviating from the claim scope of the present invention, a first subject matter may be designated as second subject matter and vice versa. The term of "and/or" includes a certain item in two or more related and specified items or the combination thereof.

When it is stated that a certain subject matter is "connected" or "linked" to another subject matter, it should be interpreted that the former may be directly connected or linked to the latter but there may be a still another subject matter in between. On the contrary, when it is stated that a subject matter is "directly connected" or "directly linked" to another subject matter, it should be interpreted that there is not any third subject matter in between.

Terms used in this Specification are just to describe specific embodiments and are not intended to set limits to the present invention. A singular term includes plurality unless otherwise indicated in another way contextually. The terms of "include/includes/including", "have/has/having", etc. must be interpreted to state that there exist, as laid down in this Specification, feature(s), number(s), phase(s), movement(s), component(s) or part(s) or combination thereof and not to preliminarily exclude any possibility of existence or addition of one or more of those features, number(s), phase(s), movement(s), component(s) or part(s) or combination thereof.

Each of all the terms, including technical or scientific ones, used in this Specification has a sense identical to what is generally understood by a person skilled in the art of the present invention. Each of terms such as ones defined in common dictionaries should be interpreted to have a sense identical to what is contextually used in the related technology and, unless otherwise clearly defined in this Specification, is not to be interpreted in an ideal or excessively formal way.

Figure 1:
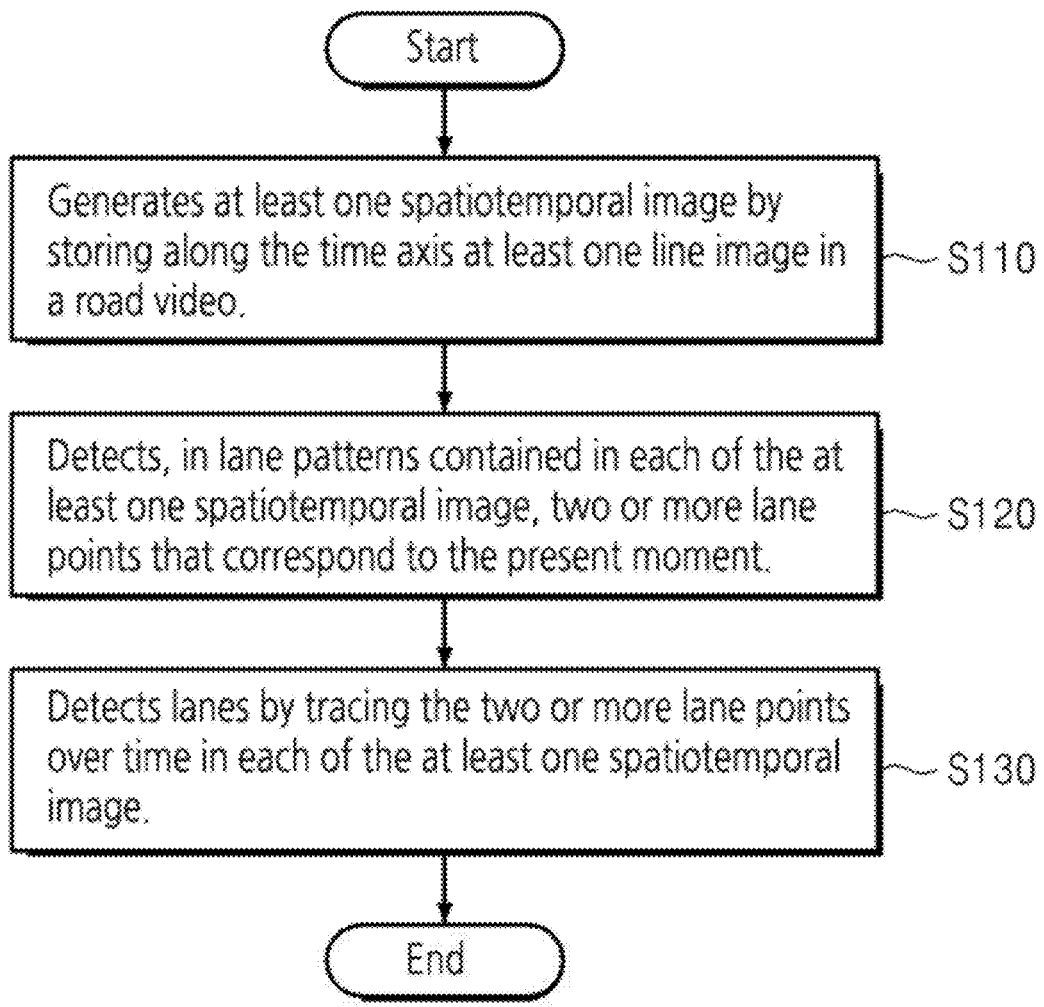
FIG. 1 is a flowchart that describes an exemplary method for detecting lanes.

Referring now to FIG. 1, a flowchart is provided that describes an exemplary method for detecting lanes. In the stage of S110, a lane detector generates at least one spatiotemporal image by storing along the time axis at least one line image that contains pixels corresponding to at least one horizontal line established in a road video. The spatiotemporal image may be generated by consecutively combining the line images in the order of storage over time and in the first direction. The details of which are described below with reference to FIG. 2 where the first direction may be either vertical (y axis) or diagonal.

In S120, the lane detector detects, in lane patterns contained in each of the at least one spatiotemporal image, two or more lane points that correspond to the present moment. In some scenarios, linearizing the lane pattern may be additionally processed in S120. For example, the lane detector: generates at least one corrected spatiotemporal image by linearizing the lane patterns contained in each of the at least one spatiotemporal image; and detects, in the linearized lane patterns contained in each of the at least one corrected spatiotemporal image, two or more lane points that correspond to the present moment. The corrected spatiotemporal image may be generated by motion-correcting adjacent line images among the two or more line images that constitute the spatiotemporal image.

Correction of linearizing the lane pattern for generating the corrected spatiotemporal image is in order to clearly detect a driving lane even when it is difficult to detect a lane because the driver changes the lane, or the road-shooting camera or the vehicle itself trembles. Details of the corrected spatiotemporal image are described below with reference to FIG. 3.

An exemplary process, that detects in the linearized lane patterns, two or more lane points that correspond to the present moment is described below with reference to FIGS. 4 and 5.

In S130, the lane detector detects lanes by tracing the two or more lane points over time in each of the at least one spatiotemporal image. More specifically, lanes are detected by tracing the coordinates of two lane points and the distance between the lane points.

Although existing technology detects lanes by tracing only two lanes, the lanes are detected herein by considering that the distance between the lane points is constant, which is advantageous in that a lane is clearly detected even when the lane has been effaced. The details are described below with reference to FIG. 7.

Figure 2:
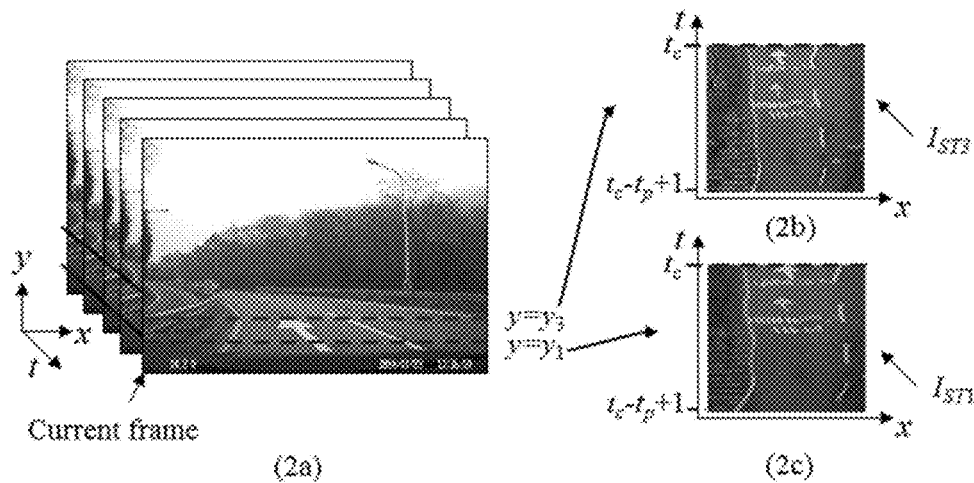
FIGS. 2a, 2b and 2c (collectively referred to as FIG. 2) each provide an exemplary spatiotemporal images.

FIG. 2 is a drawing that explains a spatiotemporal image. As illustrated in FIG. 2(a), two or more image frames are superimposed in the order of time t, where the horizontal and vertical axes of each of the image frames are x and y, respectively. Horizontal lines are established and indicated red in each of the image frames (for example, a horizontal line at $y=y_1$ to another horizontal line at $y=y_k$) so that a spatiotemporal image is generated by storing, in each of the image frame and over time, two or more line images that contain the pixels that correspond to each of the horizontal lines.

For example, the line image that corresponds to the horizontal line at y=y$_1$ in an image frame that corresponds to the moment, t$_c$−t$_p$+1, at which the spatiotemporal image was generated is stored. Line images are stored in the order of time to the line image at y=y$_1$ in an image frame that corresponds to the present moment t$_c$, which generates the spatiotemporal image at y=y$_1$ as illustrated in FIG. 2(c), where t$_c$ and t$_p$ denote the present and past moment, respectively.

FIG. 2(b) illustrates a spatiotemporal image generated based on lines at y=y$_3$ in an image frame. For example, a spatiotemporal image may comprise two or more line images extracted from the image frames within a predetermined period of time (from t$_c$−t$_p$+1 to t$_c$) among two or more image frames that constitute the video.

Although FIG. 2 illustrates a case that two or more horizontal lines are established to generate spatiotemporal images, only a single horizontal line may be established in order to generate a single spatiotemporal image corresponding thereto. However, it is advantageous for detecting lanes to generate three or more spatiotemporal images by establishing three or more horizontal lines.

Figures 3A, 3B, 3C:
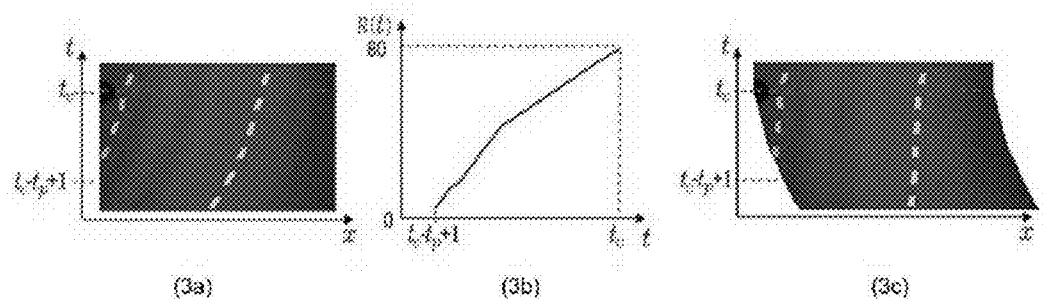
FIGS. 3a, 3b, and 3c (collectively referred to as FIG. 3) provide an illustration that describes an exemplary corrected spatiotemporal image.

FIG. 3 is a drawing that describes a corrected spatiotemporal image. FIG. 3(a) illustrates spatiotemporal images during lane change. FIG. 3(b) plots correction functions that will be applied to the spatiotemporal image of FIG. 3(a), where the horizontal and vertical axis denote time and the value of horizontal movement change over time, respectively. More specifically, the correction functions of FIG. 3(b) linearize the lane patterns contained in the spatiotemporal image by motion-correcting the two or more line images, from the line image that corresponds to t$_c$−t$_p$+1, at which the spatiotemporal image was generated to the line image that corresponds to the present moment t$_c$ that constitute the spatiotemporal image.

Here, the correction function as plotted in FIG. 3(b) may be defined by Equations 4 and 5. Suppose that I(x, y, t) is the information on the pixel positioned at (x, y) at the time t, the corresponding spatiotemporal image may be defined according to Equation 4.

$$I_{ST}(x,t)=I(x,y_k,t),$$ [Equation 4]

where x denotes the x coordinate of a pixel in a spatiotemporal image, y$_k$ denotes that the y coordinate of a pixel in a spatiotemporal image is fixed to a value, and I$_{ST}$ denotes a spatiotemporal image when y=y$_k$.

In addition, the correction function may be defined as Equation 5 based on Equation 5 regarding the spatiotemporal image.

$$R(t) = R(t-1) + \operatorname*{argmin}_{k\in[-\frac{X}{10},\frac{X}{10}]} \frac{1}{X-|k|}\left(\sum_{x=0}^{X} |I_{ST}(x, t) - I_{ST}(x-k, t-1)|\right),$$ [Equation 5]

where R(t) denotes the change in horizontal motion from the current image frame to the previous image frame, X denotes the horizontal width of the spatiotemporal image and k denotes the displacement along the horizontal axis. Equation 5 is to find a k that minimizes the value of the term that follows argmin, where −X/10≤k≤+X/10 taking into account the fact that the lane boundary does not make a jerky transition in consecutive image frames.

Consequently, the correction function as defined by Equation 5 may be applied to the spatiotemporal image as defined by Equation 4 resulting in a corrected spatiotemporal image defined as Equation 6.

$$I_R(x,t)=I_{ST}(x-R(t),t)$$ [Equation 6]

As shown in Equation 6, a corrected spatiotemporal image is generated with its x coordinates translated by R(t).

Figures 4A, 4B:
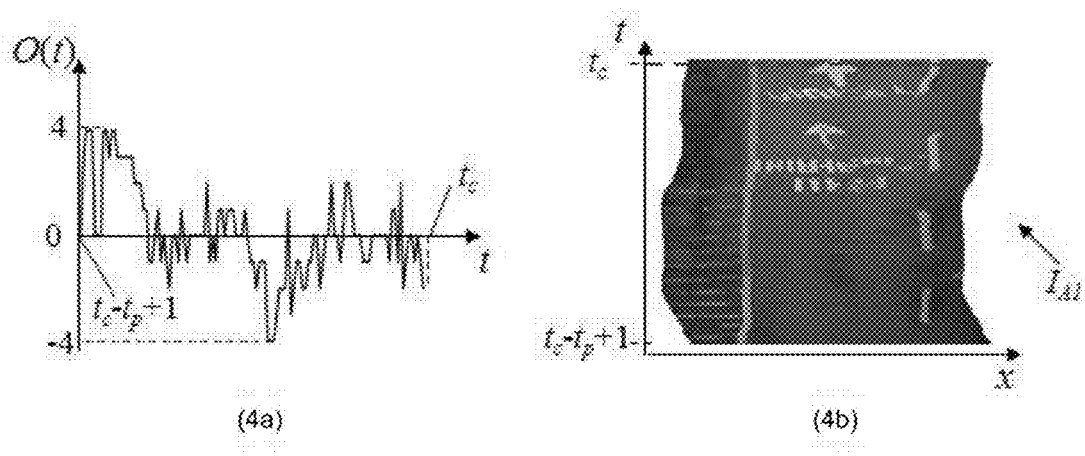
FIGS. 4a and 4b (collectively referred to as FIG. 4) provide an illustration that describes an exemplary corrected spatiotemporal image.

FIG. 4 is a drawing that describes another corrected spatiotemporal image. FIG. 4(a) plots a correction function that will be applied to the spatiotemporal image of FIG. 2(a), where the horizontal and vertical axis denotes time and the value of horizontal movement change over time, respectively. FIG. 4(b) illustrates a corrected spatiotemporal image generated by applying the correction function to the spatiotemporal image of FIG. 2(a). More specifically, the correction functions of FIG. 4(a) linearize the lane patterns contained in the spatiotemporal image by motion-correcting the two or more line images, from the line image that corresponds to t$_c$−t$_p$+1, at which the spatiotemporal image was generated to the line image that corresponds to the present moment t$_c$ that constitute the spatiotemporal image. In another embodiment of the present invention, the correction function may be defined as Equation 7.

$$O(t) = \operatorname*{argmin}_{k\in[-w_R,w_R]} SAD(k, t),$$ [Equation 7]

where O(t) denotes the change in horizontal movement from the current image frame to the previous image frame; k denotes the displacement along the horizontal axis from −wR to wR; and SAD(k, t) denotes the sum of absolute differences of the pixel values or gradient values in the consecutive line images between t and t−1 when the line image at t translates by k with reference to the line image at t−1. However, the value of change as anticipated in the previous frame may be used, instead of O(t), as the change in lateral movement from the current image frame to the previous image frame if the minimum value of SAD(O(t$_c$), t$_c$) is larger than the threshold t$_d$ at the present time t=t$_c$.

Meanwhile, a corrected spatiotemporal image may be defined as Equation 8 by applying the correction function as defined by Equation 7 to a spatiotemporal image defined by Equation 4.

$$I_A(x, t_c) = I_{ST}\left(x\sum_{t=t_i}^{t_c} O(t), t_c\right),$$ [Equation 8]

As shown in Equation 8, a corrected spatiotemporal image is generated with its x coordinates translated by O(t).

Figure 5:
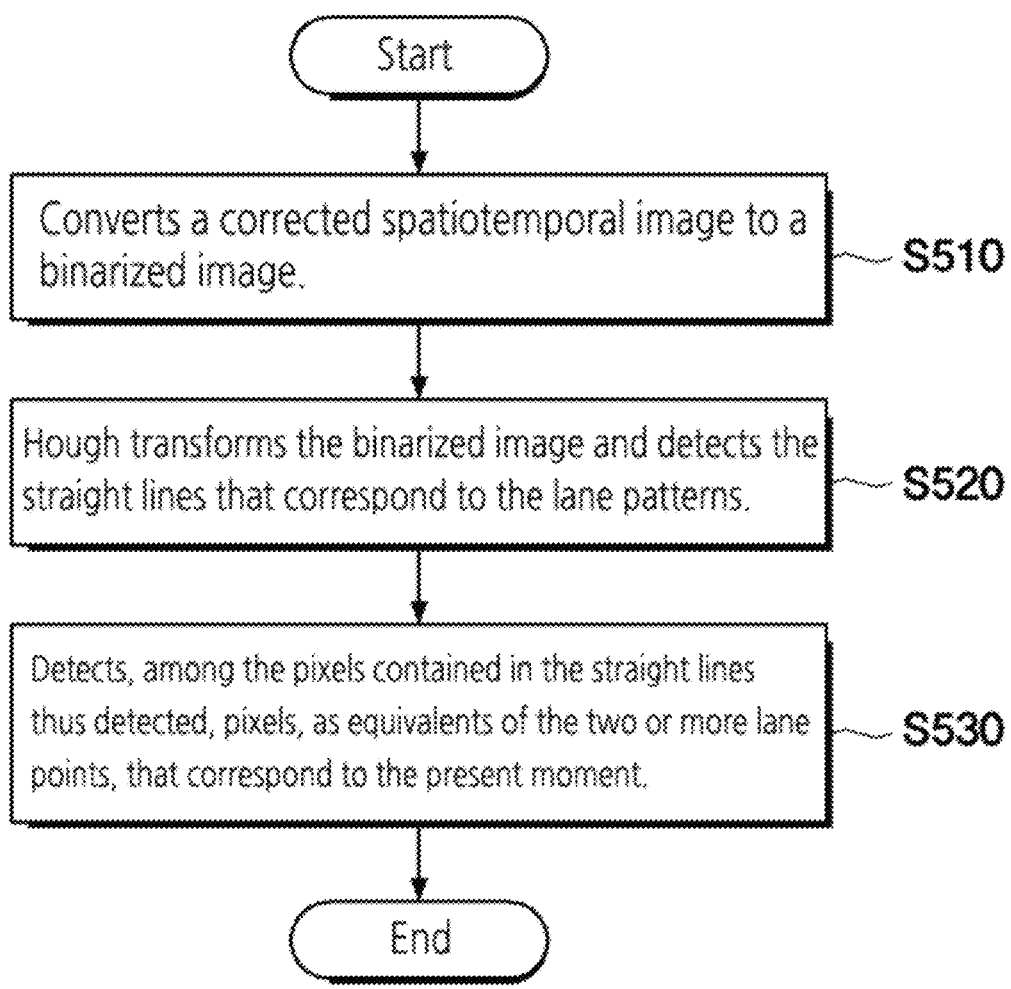
FIG. 5 is a flowchart that describes an exemplary method for detecting lane points.

FIG. 5 is a flowchart that describes a method for detecting lane points. In S510, the lane detector converts the corrected spatiotemporal image to a binarized image. Accordingly, pixels that correspond to lane patterns in the corrected spatiotemporal image may be converted to white pixels while the other pixels, to black ones.

In some scenarios, the binarized image is generated by converting each of the line images that constitute the corrected spatiotemporal image using the average value of a 1-dimentional Gaussian function as defined by Equation 9.

$$g(x) = A\exp\left(-\frac{(x-\mu)^2}{2\sigma^2}\right)+b,$$ [Equation 9]

where A, μ, σ and b denote amplitude, average, standard deviation and the offset of the Gaussian function, respectively. The Gaussian function G(x) is defined within a sliding window that has a dimension of W relatively to time t, while the offset of the Gaussian function b may be omitted by subtracting the minimum value from the sliding window.

Additionally or alternatively, a dilation morphology technique may be applied in order to compensate for the fact that the lane patterns are not displayed organically if the lane patterns contained in the binarized images are generated using the average value of a Gaussian function such as Equation 9.

Additionally or alternatively, a morphology technique (such as opening and closing) may be applied to a binarized image after applying a two-dimensional Gaussian filter and adaptive threshold directly to a spatiotemporal image.

Referring again to FIG. 5, the lane detector Hough transforms the binarized image and detects the straight lines that correspond to the lane patterns, as shown by step S520. Here, only those lines the angle of which ranges from 80 to 100 degrees may be detected in Hough transform, taking into account the fact that lanes are arrayed vertically, which may reduce the calculation amount of the Hough transform. In some scenarios, the straight lines that correspond to the lane patterns may be detected by the existing technology for detecting the straight lines, taking into account the pixel values in the spatiotemporal image. In S530, the lane detector detects, among the pixels contained in the straight lines thus detected, pixels, as equivalents of the two or more lane points, that correspond to the present moment.

A method for detecting lanes by detecting lane points as illustrated in FIG. 5 has an advantageous effect in that the lanes are clearly detected even when there exists a noise that looks similar to a lane such as light rise.

Figure 6:
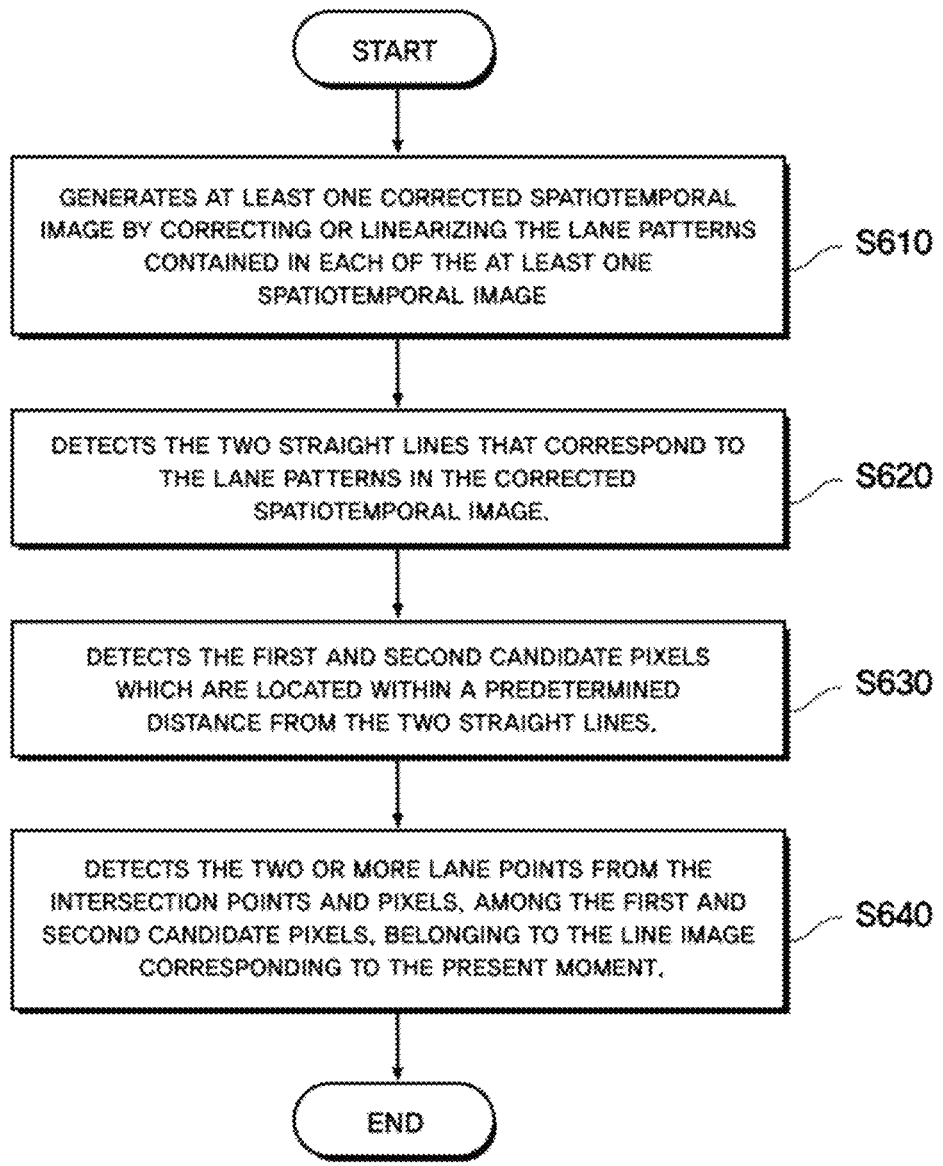
FIG. 6 is a flowchart that describes an exemplary method for detecting lane points.

FIG. 6 is a flowchart that describes a method for detecting lane points. In S610, a lane detector generates at least one corrected spatiotemporal image by correcting or linearizing the lane patterns contained in each of the at least one spatiotemporal image. In S620, the lane detector detects the two straight lines that correspond to the lane patterns in the corrected spatiotemporal image. In S630, the lane detector detects the first and second candidate pixels that correspond to the connected groups of the pixels which have the pixel values within a predetermined range and are located within a predetermined distance from the two straight lines, respectively. For example, the pixels which have the pixel values corresponding a predetermined range may be pixels of which colors are white.

The connected group of the pixels which are located within a predetermined distance may include the set of pixels nearest to the intersection point of the two straight lines and the present moment line image. Thus, the first candidate pixels correspond to the connected group of the pixels which have the pixel values within a predetermined range and are located within a predetermined distance from the left straight line. The second candidate pixels correspond to the connected group of the pixels which have the pixel values within a predetermined range and are located within a predetermined distance from the right straight line. In some scenarios, the connected groups of the pixels, which have the pixel values within a predetermined range and are located within a predetermined distance from the two straight lines, respectively, are detected as the first and second candidate pixels only if the number of the pixels in the said group is larger than or equal to a threshold value. If the number of the pixels in the said group is less than the threshold value, the group may be excluded from the first and second candidate pixels.

However, since there may exist the white pixels due to a noise that looks similar to a lane among the pixels correspond to the lane patterns, the exclusion of the pixels, among the first and second candidate and pixels thus detected, the pixels (the pixels due to a noise) which have pixel values different from pixel values of the pixels that correspond to the lane patterns in the previous image frame that corresponds to just before the present moment from the first and second candidate pixels may be additionally processed.

In some scenarios, converting at least one corrected spatiotemporal image to a binarized image may be additionally processed among S610 and S620. In S620, the Hough transform may be applied into the said binarized image. Two straight lines that correspond to the lane patterns in at least one corrected spatiotemporal image may be detected. In this case, the first and second candidate pixels can consist of the connected groups of the white pixels which are located within a predetermined distance from the two straight lines, respectively.

In S640, the lane detector detects the two or more lane points from the intersection points between the line image corresponding to the present moment and the two straight lines and pixels, among the first and second candidate pixels, belonging to the line image corresponding to the present moment. More specifically, the lane detector detects as lane points the pixels that correspond to the center of pixels among each of the first and second candidate pixels, belonging to the line image corresponding to the present moment, if the first and second candidate pixels are detected. If at least one of the first and second candidate pixels is not detected, the lane detector detects as at least one of lane points at least one of the intersection points between the line image corresponding to the present moment and at least one of the two straight lines. In other words, if the first and second candidate pixels are detected, the lane points are detected from them. However, if the first and pixels are not detected, the lane points are detected from the intersection points between the line image corresponding to the present moment and the two straight lines. The camera slightly trembles even in normal driving, which makes the pitch angle change and causes errors in the linearization process.

The method for detecting lanes by detecting lane points according the technique illustrated in FIG. 6 has an advantageous effect in that the method clearly detects lanes even when errors occur in the linearization process due to a noise that looks similar to a lane such as nearby obstacle, conditions of the road surface, light rise, etc. The method helps detect a lane in the next frame or in the next linearization process by using the lane points thus detected.

Figures 7A, 7B:
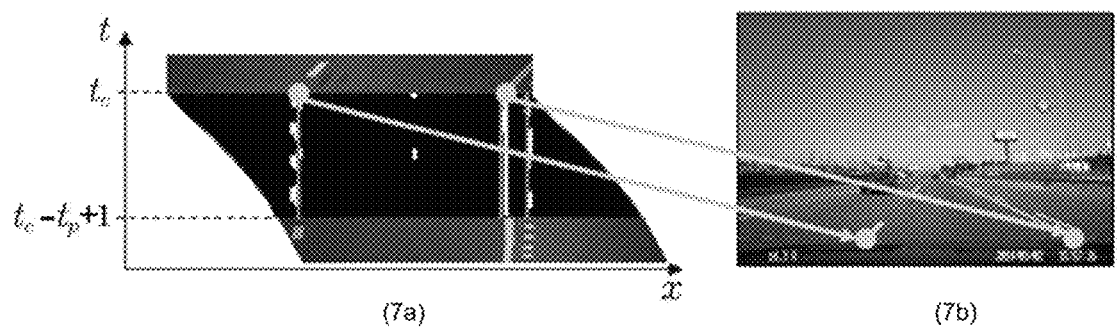
FIGS. 7a and 7b (collectively referred to as FIG. 7) provide an illustration that describes an exemplary method for detecting lane points.

FIG. 7 is a drawing that describes a method for detecting lane points. FIG. 7(a) illustrates straight lines that correspond to lane patterns on a binarized image that has been binarized based on Hough transform, where the intersections between the straight lines and the horizontal line that denotes the present moment $t_c$ become the lane points. More specifically, as illustrated in FIG. 7(a), there are three azure straight lines that correspond to the lane patterns. The horizontal line that denotes the present moment $t_c$ intersects with the straight lines resulting in three intersections. In this case, the lane points are not to be established to three but, instead, two or more pixels positioned most proximately to the center of the horizontal line that denotes the present moment $t_c$. The two lane points thus detected in FIG. 7(a)

are indicated on the image frame that corresponds to the present moment $t_c$, as illustrated in FIG. 7(b).

Figure 8:
FIG. 8 is an exemplification of a detected lane based on a method for detecting lane points.

FIG. 8 is an exemplification of a detected lane based on a method for detecting lane points. Five red dashed lines and five lane point pairs are shown on an image frame that corresponds to the present moment $t_c$, as illustrated in FIG. 8. The five red dashed lines denote that horizontal lines that amount to five are established on the image frame. The five lane point pairs denote the lane points that correspond to the five horizontal lines.

In FIG. 8, five lane point pairs are displayed on an image frame that corresponds to the present moment $t_c$, where the points that are best-fitted to the ellipse according to the RANSAC (RANdom SAmple Consensus) algorithm are indicated blue. Meanwhile, in FIG. 8, there are red solid lines that link each of the lane points in a vertical direction, where the red solid lines are the lanes that are to be finally detected.

Figure 9:
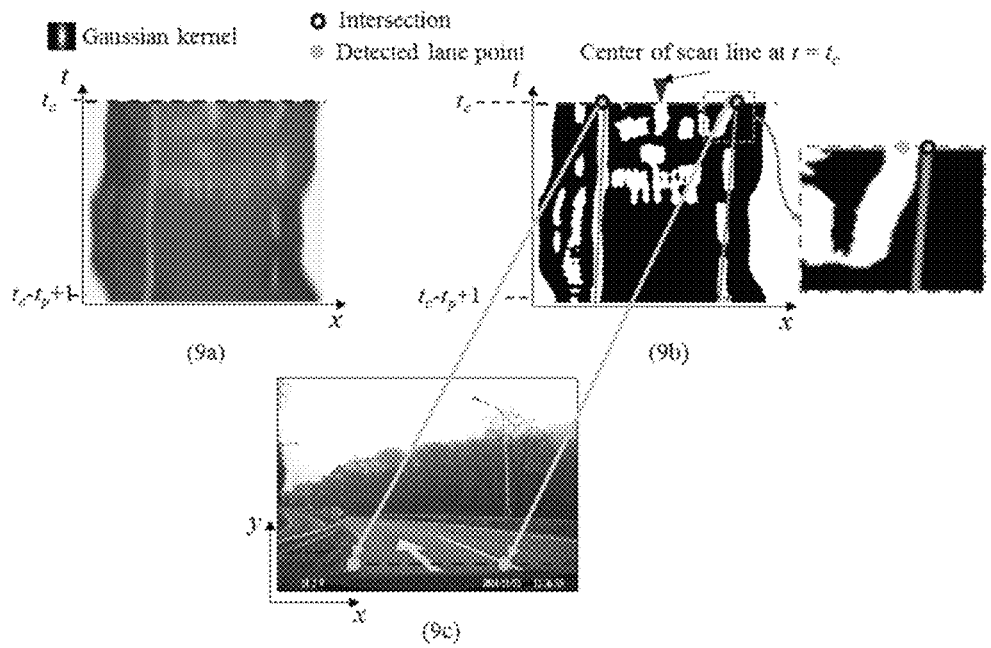
FIGS. 9a, 9b and 9c (collectively referred to as FIG. 9) provide an illustration that describes an exemplary method for detecting lane points.

FIG. 9 is a drawing that describes a method for detecting lane points. FIG. 9(a) illustrates an exemplification of a two-dimensional Gaussian filter applied to a spatiotemporal image. FIG. 9(b) shows azure straight lines that correspond to lane patterns on a binarized image that has been binarized based on Hough transform, where, with reference to the intersections (blue hollow circles) at which the azure straight lines intersect with the horizontal line that denotes the present moment $t_c$, the two white pixels positioned at the center of the white pixels that are adjacently connected to the intersections become lane points. For example, in the right lane patterns that are magnified on the right side of FIG. 9(b), the white pixel that corresponds to the intersection, at which the straight line that corresponds to the right lane intersects with the horizontal line that corresponds to the present moment $t_c$, is indicated as a blue hollow circle while the white pixel that is positioned at the center of the white pixels, or the second candidate pixels, that are adjacently connected to the blue hollow circle is indicated green. The two lane points detected in FIG. 9(b) on the image frame that corresponds to the present moment $t_c$ are indicated as green circles, as illustrated in FIG. 9(c).

Figure 10:
FIG. 10 is an exemplification of a detected lane based on a method for detecting lane points.

FIG. 10 is an exemplification of a detected lane based on a method for detecting lane points. FIG. 10 shows seven lane point pairs that correspond to the present moment $t_c$, where the green lane point indicates a case that the white pixel positioned at the center of the first or second candidate pixels has been selected as a lane point while the blue lane point indicates a case, on a corrected spatiotemporal image, that the intersection at which the straight line that corresponds to lane patterns intersects with the horizontal line that corresponds to the present moment $t_c$ has been detected as a lane point. Here, the seven lane point pairs may be fitted to an ellipse or three-dimensional curve based on the weighted least square or RANSAC algorithm. Preferably, for the purpose of more exact lane fitting, the weight factor for the green and blue lane point may be 0.75 and 0.25, respectively.

For a more complicated lane on the road, such an algorithm may be extended with ease by going up the number of the horizontal lines. FIG. 10 shows red solid lines that connect two or more lane points and such a red line becomes the lane that is to be finally detected.

Figures 11A, 11B, 11C:
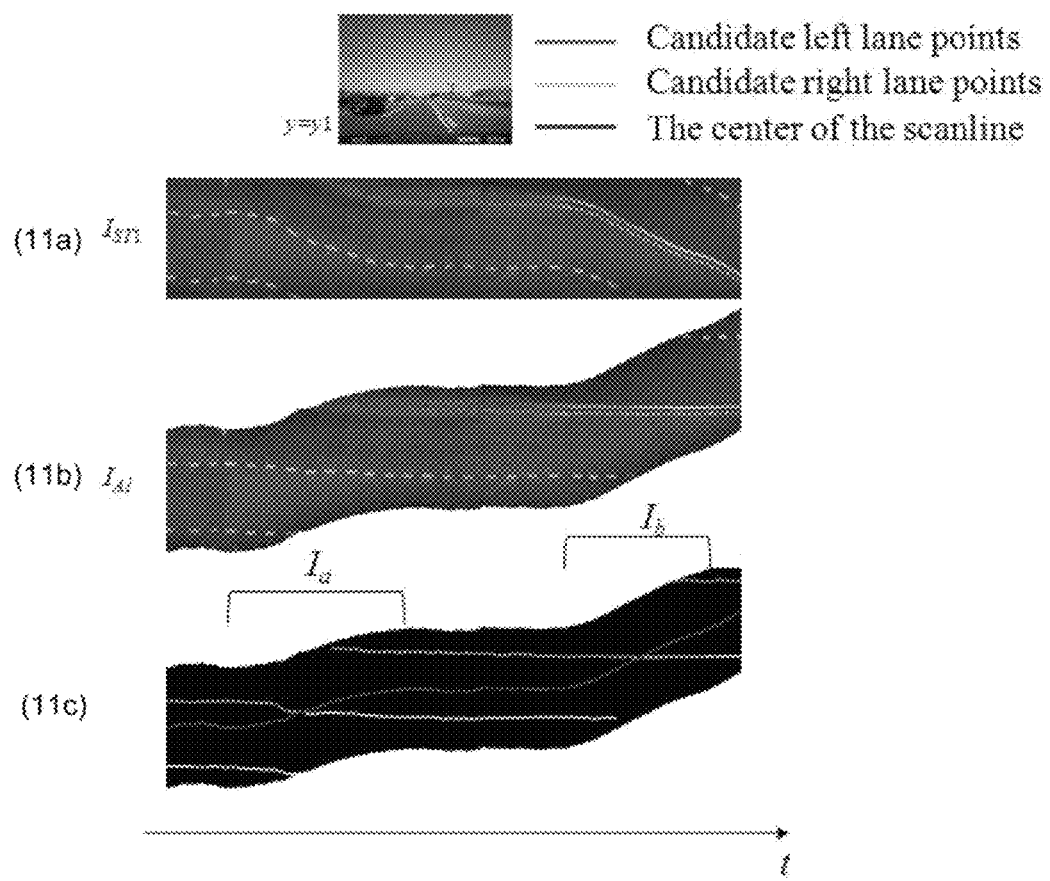
FIGS. 11a, 11b and 11c (collectively referred to as FIG. 11) provide an illustration useful for understanding an exemplary method for detecting lanes applied to a case that a vehicle changes the lanes.

FIG. 11 is an exemplification of a method for detecting lanes applied to a case that a vehicle changes the lanes. When the driver changes the lane, the path the lane points make inclines or becomes curved. A spatiotemporal image as shown in FIG. 11(a) is converted to a corrected spatiotemporal image as shown in FIG. 11(b), where the path the lane points make is corrected to a straight line although the path inclines in the section within which the driver changes the lane (Ia and Ib in FIG. 11). FIG. 11(c) shows the results of the lane points found based on Hough transform. That the lane has been changed is clearly verified by comparing the center of the horizontal line indicated red with the lane points in blue and yellow.

Figures 12A, 12B, 12C, 12D, 12E, 12F, 12G, 12H, 12I, 12J, 12K, 12L, 12M, 12N, 12O:
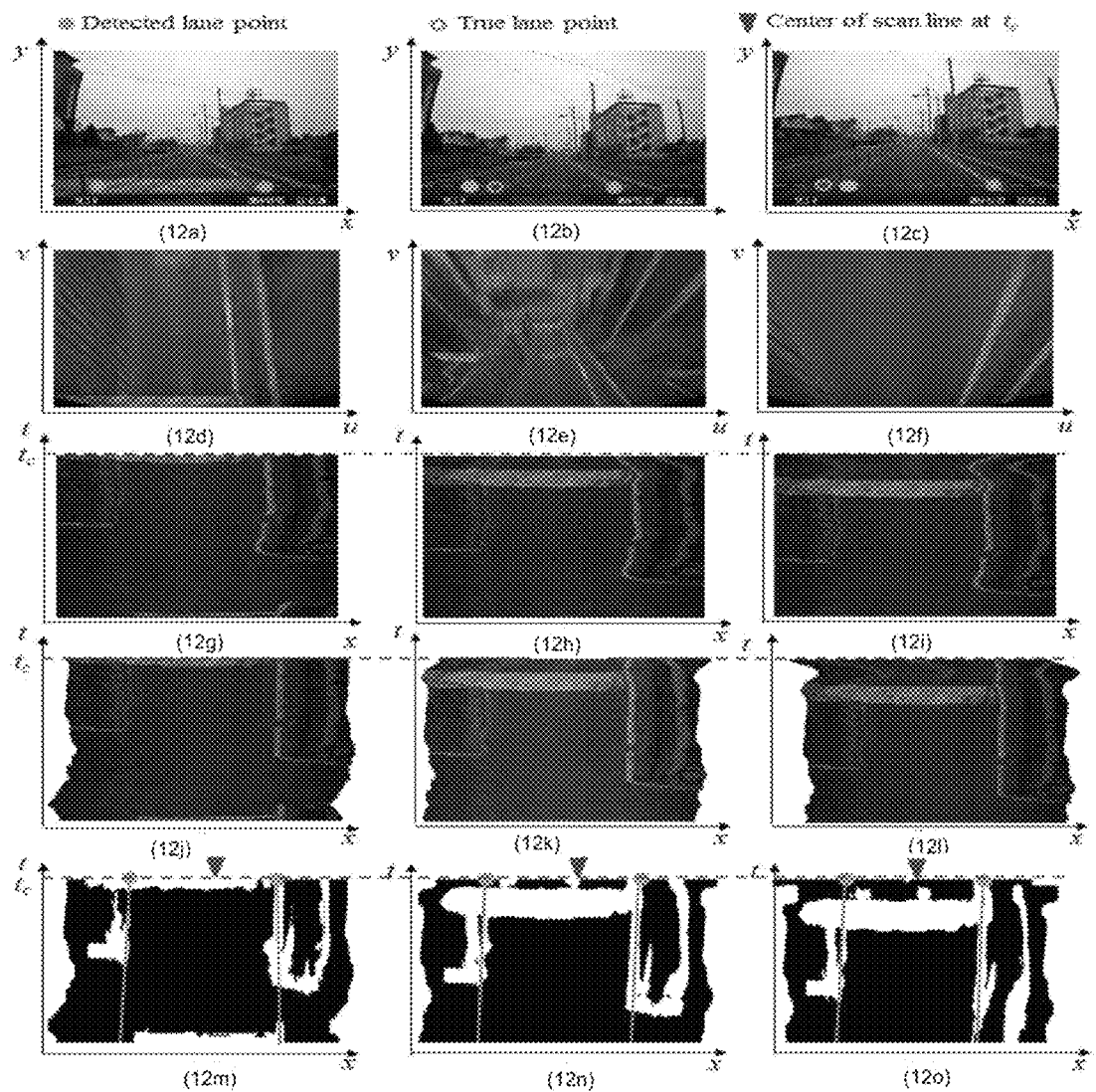
FIGS. 12a, 12b, 12c, 12d, 12e, 12f, 12g, 12h, 12i, 12j, 12k, 12l, 12m, 12n, 12o (collectively referred to as FIG. 12)

FIG. 12 is an exemplification of a method for detecting lanes applied to a case of existence of a speed bump. FIG. 12 is an exemplification of a method for detecting lanes in case that the pitch angle abruptly changes due to a speed bump under the condition that the left lane is not clearly visible but the right lane is clearly visible. FIG. 12(a) illustrates an input image under a normal condition. FIG. 12(b) illustrates an input image when a vehicle climbs up a speed bump. FIG. 12(c) illustrates an input image when the vehicle climbs down the speed bump.

FIGS. 12(d), (e) and (f) are IPM (inverse perspective transform) images generated by existing technology. FIGS. 12(g), (h) and (i) are spatiotemporal images. FIGS. 12(j), (k) and (l) are corrected spatiotemporal images. FIGS. 12(m), (n) and (o) are binarized images. Because FIGS. 12(k) and (l) are corrected with reference to the right lane, a slight amount of error occurs in detecting the left lane. IPM images change very sensitively to the pitch angle as shown in FIGS. 12(e) and (f), which implies that the existing technology may not exactly detect lane even when the pitch angle does not change abruptly. On the contrary, the method exactly detects lanes immediately off the speed bump. As long as the lanes on either side are clearly identifiable or the pitch angle does not change abruptly an embodiment of the present invention may detect the lanes more exactly.

Figures 13A, 13B, 13C, 13D, 13E, 13F, 13G:
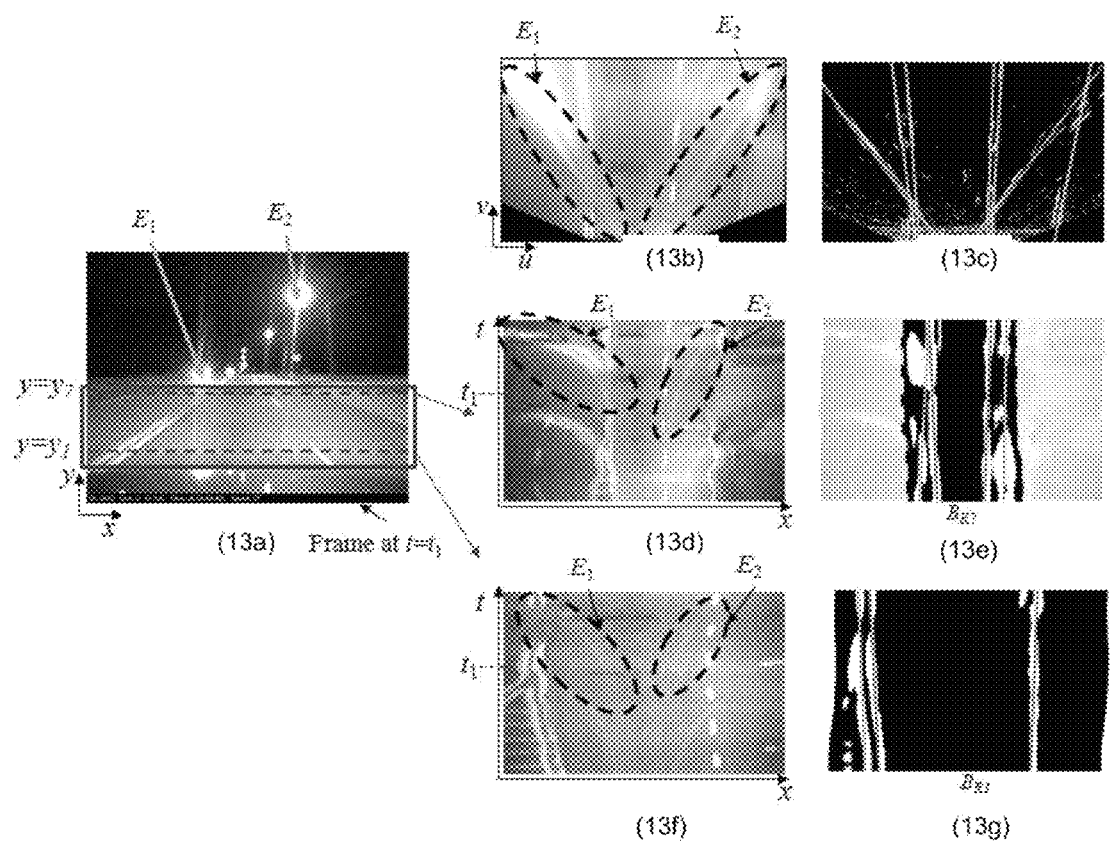

FIG. 13 is an exemplification of a method for detecting lanes applied to a case of existence of a light rise. FIG. 13(a) is an input image in which light rises occur, where E1 and E2 denote a light rise caused by a vehicle and a streetlight, respectively. The red dashed lines in FIG. 13(a) denote the horizontal lines to generate spatiotemporal patterns while the violet box denotes a ROI (region of interest) to generate an IPM image based on existing technology. FIGS. 13(b) and (c) denote an IPM image based on existing technology and the binarized image that corresponds thereto, respectively. FIGS. 13(d) and (e) denote a spatiotemporal image generated based on the horizontal line $y=y_7$, and the binarized image that corresponds thereto, respectively. FIGS. 13 (f) and (g) denote a spatiotemporal image generated based on the horizontal line $y=y_1$ and the binarized image that corresponds thereto, respectively. The method exactly detects lanes by detecting two lanes that are parallel to each other because, as shown in FIGS. 13(d) and (f), a light rise appears as curved lines and a lane appears as a straight line in a spatiotemporal image.

Furthermore, in some scenarios, lanes are exactly detected even with an error in the linearization process of a spatiotemporal pattern because the process detects as lane points, with reference to the intersections of the straight line thus detected and the horizontal line, the white pixels positioned at the center of the white pixels adjacently connected to and including the intersections. On the contrary, it is difficult to exactly detect lanes in the IPM images based on existing technology because both light rise and lane appear as lines as shown in FIG. 13(c).

FIG. 14 is an exemplification of a method for detecting lanes applied to a case of a lane effaced. FIG. 14(a) is an image frame of a road with a lane effaced, where part of the right lane has been effaced resulting in an unclear lane although the left lane appears clear. FIG. 14(b) shows the lane detected by existing technology, where, although the left lane is detected properly, the right lane part of which has been effaced is not properly detected and a lane located to the right of the actual lane is detected. Lanes detected are shown in FIG. 14(c), where, although part of the right lane has been effaced, the lanes on either side are clearly detected.

The method for detecting lanes when an effaced lane exists is described in detail below. First, a lane detector determines whether there exists in the lane points a lane point that is untraceable. Then, the lane detector establishes, if it determines that there exists in the lane points a lane point that is untraceable, a point in the lane points that is positioned at the same distance as that between the lane points from the first lane point that is traceable in the lane points as the second lane point. The second lane points are established using the distance between the lane points because, according to the present method that detects lanes based on spatiotemporal images, the distance between the lane points are kept constant over time. Finally, the lane detector detects the lanes by tracing the first lane points and the second lane points and the distance between the lane points. Here, the first and second lane points and the distance between the lane points may be traced using a tracing algorithm such as Kalman Filter.

According to other scenarios, if it is determined that there exists an effaced lane or a lane point that is untraceable, the distance between the lane points are not used and, instead, the intersections at which the straight lines that correspond to the lane patterns intersects with the horizontal line that corresponds to the present moment $t_c$ in a corrected spatiotemporal image may be selected as lane points.

The blue lane points in FIG. 14(c) are the intersections at which the straight lines that correspond to the lane patterns intersect with the horizontal line that corresponds to the present moment, $t_c$, and selected as the lane points that correspond to the lane effaced.

Figures 15A, 15B, 15C, 15D, 15E:
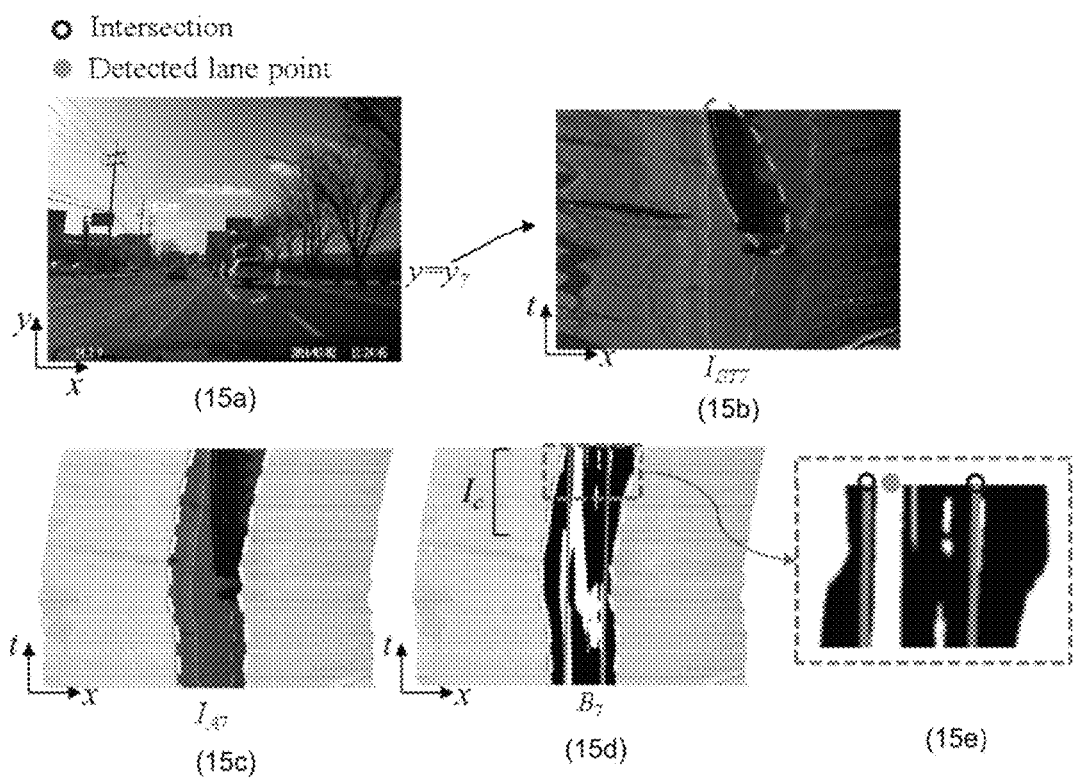

FIG. 15 is an exemplification of a method for detecting lanes applied to a case that an obstacle appears ahead. FIG. 15(a) is an input image with an obstacle ahead, where the dashed green circle indicates the obstacle. FIG. 15(b) shows a spatiotemporal image that corresponds to the horizontal line $y=y_7$. FIG. 15(c) shows a corrected spatiotemporal image. FIG. 15(d) shows a binarized image, where azure lines that correspond to the lane patterns appears. FIG. 15(e) is a magnified image of the region of the lane points detected in FIG. 15(d). The region enclosed by yellow lines, as illustrated in FIG. 15, is required to find the value of motion correction and only the region enclosed by yellow lines are used to calculate the value of motion correction. Ic in FIG. 15(d) denotes the region in which an error has occurred during the linearization process. Such an error causes the fact that the left azure straight line is away from the actual lane patterns as in the left lane of FIG. 15(e).

On the contrary, the present technique may detect lanes more exactly because the present technique establishes as the lane point (the lane point colored green) the white pixel positioned at the center of the first candidate pixels that correspond to the connected group of the white pixels which is nearest from the left straight line along the direction of the present moment line image, not the intersection indicated blue in the left azure straight line. As described above, the intersections denote the points at which the straight lines that correspond to the lane patterns intersect with the horizontal line that corresponds to the present moment $t_c$ in a corrected spatiotemporal image. In the right lane, the intersections colored blue are determined as lane points because the obstacle ahead covers up the lane. In case that an obstacle entirely covers up both the left and right lanes for a certain period of time, an embodiment of the present invention resumes the lane point detection process from the very beginning.

FIG. 16 is a schematic diagram that describes an apparatus for detecting lanes. As illustrated in FIG. 16, an apparatus for detecting lanes according to an embodiment of the present invention includes a spatiotemporal image generator 1610, a point detector 1620 and a lane detector 1630. The spatiotemporal image generator 1610 generates at least one spatiotemporal image by storing along the time axis at least one line image that contains pixels corresponding to at least one horizontal line established in a road video. The point detector 1620 detects, in lane patterns contained in each of the at least one spatiotemporal image, two or more lane points that correspond to the present moment. In some scenarios, the point detector 1620 may generate a corrected spatiotemporal image by correcting the spatiotemporal image, which is described below with reference to FIG. 17. The lane detector 1630 detects lanes by tracing the two or more lane points over time in each of the at least one spatiotemporal image.

FIG. 17 is a schematic diagram that describes a point detector. The point detector 1620 may include a corrector 1622 and a point processor 1624 as illustrated in FIG. 17. The corrector 1622 generates at least one corrected spatiotemporal image by linearizing the lane patterns contained in each of the at least one spatiotemporal image. The point processor 1624 detects, in the linearized lane patterns contained in each of the at least one corrected spatiotemporal image, two or more lane points that correspond to the present moment. In some scenarios, the point processor 1624 may additionally include detailed components, which are described below with reference to FIG. 18.

FIG. 18 is a schematic diagram that describes a point processor. As illustrated in FIG. 18, the point processor 1624 includes a binarizer 1624a, a Hough transformer 1624b and a pixel processor 1624c. The binarizer 1624a converts the corrected spatiotemporal image to a binarized image. The Hough transformer 1624b Hough transforms the binarized image and detects straight lines that correspond to the lane patterns. The pixel processor 1624c detects, among the pixels contained in the straight lines thus detected, pixels, as equivalents of the two or more lane points that correspond to the present moment. In some scenarios, the pixel processor 1624c detects the first and second candidate pixels that correspond to the lane patterns and are white with reference to each of the two straight lines detected via the Hough transformer 1624b and detects as lane points the white pixels that correspond to the center of the first and second candidate pixels thus detected.

FIG. 19 is a schematic diagram that describes a lane detector. The lane detector 1630 includes a determiner 1632, an establisher 1634 and a lane processor 1636 in an embodiment of the present invention as illustrated in FIG. 19. The determiner 1632 determines whether there exists in the lane points a lane point that is untraceable based on the lane point detection results of the point detector 1620. For example, in the spatiotemporal image that corresponds to $y=y_k$, if the point detector 1620 detects only a lane point but fails to detect the other lane point because the lane has been effaced, etc. although the point detector 1620 intends to detect the lane points that correspond to the present moment $t_c$, the determiner 1632 determines that there exists a lane point that is untraceable based on the fact that the point detector 1620 has detected only a single lane point.

The establisher 1634 establishes, if the determiner 1642 determined that there exists in the lane points a lane point that is untraceable, a point in the lane points that is positioned at the same distance as that between the lane points from the first lane point that is traceable in the lane points as the second lane point. The lane processor 1636 detects the lanes by tracing the first lane point and the second lane point and the distance between the lane points. In some scenarios, the lane processor 1636 may determine, in a corrected spatiotemporal image, the intersections at which the straight lines that correspond to the lane patterns intersect with the horizontal line that corresponds to the present moment $t_c$ as the lane points for the lane effaced.

A method and an apparatus for detecting lanes clearly detect lanes even when a lane has been effaced or there exists a noise that looks similar to a lane. The above described methods may be built up into an application that is executable in a computer set and, via recording media that can be read and comprehended by a computer, achieved in a general-purpose digital computer that executes the application. The recording media that can be read and comprehended by a computer include magnetic recording media such as ROM, floppy disc, hard disc, etc. as well as computer-readable optical media such as CD-ROM, DVD, etc.

The present invention has been described so far with reference to embodiments of the present invention. A person skilled in the art may acknowledge that the present invention may be achieved into various modifications within the basic features of the present invention. Therefore, the embodiments so far disclosed must be considered explicative, not definitive. The scope of the present invention is clear in the scope of Claims, not in the description that has been so far stated and all the differences within the scope of the equivalents must be interpreted to be included in the present invention.

What is claimed is:

1. A method for detecting lanes, including:
   generating at least one spatiotemporal image by storing along the time axis at least one line image that contains pixels corresponding to at least one horizontal line established in a road video;
   detecting, in lane patterns contained in each of the at least one spatiotemporal image, two or more lane points that correspond to the present moment; and
   detecting lanes by tracing the two or more lane points over time in each of the at least one spatiotemporal image.

2. The method for detecting lanes of claim 1, wherein in the generating at least one spatiotemporal image, generates the spatiotemporal image by consecutively combining the line images in the order of storage over time and in the first direction which corresponds to the order of time.

3. The method for detecting lanes of claim 1, wherein the spatiotemporal image comprises two or more line images extracted from the image frames within a predetermined period of time among two or more image frames that constitute the video.

4. The method for detecting lanes of claim 1, wherein in the detecting, in lane patterns contained in each of the at least one spatiotemporal image, two or more lane points that correspond to the present moment includes:
   generating at least one corrected spatiotemporal image by linearizing the lane patterns contained in each of the at least one spatiotemporal image; and
   detecting, in the linearized lane patterns contained in each of the at least one corrected spatiotemporal image, two or more lane points that correspond to the present moment.

5. The method for detecting lanes of claim 4, wherein in the generating at least one corrected spatiotemporal image or linearizes the lane patterns contained in the spatiotemporal image by motion-correcting adjacent line images among the two or more line images that constitute the spatiotemporal image.

6. The method for detecting lanes of claim 5, wherein in the generating at least one corrected spatiotemporal image, executes the motion correction according to the following Equations:

$$I_{ST}(x, t) = I(x, y_k, t); \text{ and}$$

$$R(t) = R(t-1) + \operatorname*{argmin}_{k \in [-\frac{X}{10}, \frac{X}{10}]} \frac{1}{X - |k|} \left( \sum_{x=0}^{X} |I_{ST}(x, t) - I_{ST}(x-k, t-1)| \right),$$

where x denotes the x coordinate of a pixel in a spatiotemporal image, $y_k$ denotes that the y coordinate of a pixel in a spatiotemporal image is fixed to a value $y_k$, $I_{ST}$ denotes a spatiotemporal image when $y=y_k$, $R(t)$ denotes the change in horizontal motion from the current image frame to the previous image frame, X denotes the horizontal width of the spatiotemporal image, and k denotes the displacement along the horizontal axis.

7. The method for detecting lanes of claim 4, wherein in the detecting, in the linearized lane patterns, two or more lane points that correspond to the present moment includes:
   converting the corrected spatiotemporal image to a binarized image;
   Hough transforming the binarized image and detecting straight lines that correspond to the lane patterns; and
   detecting, among the pixels contained in the straight lines thus detected, pixels, as equivalents of the two or more lane points, that correspond to the present moment.

8. The method for detecting lanes of claim 7, wherein in the Hough transforming the binarized image and detecting straight lines that correspond to the lane patterns, detects, when Hough transforming, only the straight lines the angle of which ranges from 80 to 100 degrees.

9. The method for detecting lanes of claim 7, wherein in the detecting, among the pixels contained in the straight lines thus detected, pixels that correspond to the present moment and are equivalent to the two or more lane points detects, among the pixels that correspond to the present moment, two pixels that are most proximate to the center of the corrected spatiotemporal image in the second direction as equivalents of the two or more lane points.

10. The method for detecting lanes of claim 1, in the detecting the lanes, detects the lanes by tracing the coordinates of the lane points and the distance between the lane points.

11. The method for detecting lanes of claim 1, wherein in the detecting the lanes includes:
   determining whether there exists in the lane points a lane point that is untraceable;
   establishing, if it is determined that there exists in the lane points a lane point that is untraceable, a point in the lane points that is positioned at the same distance as that between the lane points from the first lane point that is traceable in the lane points as the second lane point; and detecting the lanes by tracing the first lane point and the second lane point and the distance between the lane points.

12. An apparatus for detecting lanes, including:
a computer processor;
a data storage device, and
computer readable code stored in the data storage device and executable by the computer processor, the computer readable code defining functional units which include:
a spatiotemporal image generator that generates at least one spatiotemporal image by storing along the time axis at least one line image that contains pixels corresponding to at least one horizontal line established in a road video;
a point detector that detects, in lane patterns contained in each of the at least one spatiotemporal image, two or more lane points that correspond to the present moment; and
a lane detector that detects lanes by tracing the two or more lane points over time in each of the at least one spatiotemporal image.

13. The apparatus for detecting lanes of claim 12, wherein the point detector includes:
a corrector that generates at least one corrected spatiotemporal image by linearizing the lane patterns contained in each of the at least one spatiotemporal image; and
a point processor that detects, in the linearized lane patterns contained in each of the at least one corrected spatiotemporal image, two or more lane points that correspond to the present moment.

14. The apparatus for detecting lanes of claim 13, wherein the point processor includes:
a binarizer that converts the corrected spatiotemporal image to a binarized image; a Hough transformer that Hough transforms the binarized image and detects straight lines that correspond to the lane patterns; and
a pixel processor detects, among the pixels contained in the straight lines thus detected, pixels, as equivalents of the two or more lane points, that correspond to the present moment.

15. The apparatus for detecting lanes of claim 12, the lane detector includes:
a determiner that determines whether there exists in the lane points a lane point that is untraceable;
an establisher that establishes, if it is determined that there exists in the lane points a lane point that is untraceable, a point in the lane points that is positioned at the same distance as that between the lane points from the first lane point that is traceable in the lane points as the second lane point; and
a lane processor that detects the lanes by tracing the first lane point and the second lane point and the distance between the lane points.

16. A method for detecting lanes, including:
generating at least one spatiotemporal image by storing along the time axis at least one line image that contains pixels corresponding to at least one horizontal line established in a road video;
generating at least one corrected spatiotemporal image by linearizing the lane patterns contained in each of the at least one spatiotemporal image;
detecting two straight lines that correspond to the lane patterns in the at least one corrected spatiotemporal image;
detecting the first and second candidate pixels that correspond to the connected groups of the pixels which have the pixel values within a predetermined range and are located within a predetermined distance from the two straight lines, respectively;
detecting as the two or more lane points from the intersection points between the line image corresponding to the present moment and the two straight lines and pixels, among the first and second candidate pixels, belonging to the line image corresponding to the present moment; and
detecting lanes by tracing the two or more lane points over time in each of the at least one spatiotemporal image.

17. The method for detecting lanes of claim 16, wherein in the generating at least one spatiotemporal image, generates the spatiotemporal image by consecutively combining the line images in the order of storage over time and in the first direction which corresponds to the order of time.

18. The method for detecting lanes of claim 16, wherein the spatiotemporal image comprises two or more line images extracted from the image frames within a predetermined period of time among two or more image frames that constitute the video.

19. The method for detecting lanes of claim 16, wherein in the generating at least one corrected spatiotemporal image, executes the motion correction according to the following Equation:

$$O(t) = \operatorname*{argmin}_{k \in [-w_R, w_R]} SAD(k, t),$$

where O(t) denotes the change in horizontal movement from the current image frame to the previous image frame, k denotes the displacement along the horizontal axis from −wR to wR, and SAD(k, t) denotes the sum of absolute differences of the pixel values or gradient values in the consecutive line images between t and t−1 when the line image at t translates by k with reference to the line image at t−1.

20. The method for detecting lanes of claim 16, wherein in the detecting as the two or more lane points, if the first and second candidate pixels are detected, detects as lane points the pixels that correspond to the center of pixels from each of the first and second candidate pixels, belonging to the line image corresponding to the present moment and if at least one of the first and second candidate pixels is not detected, detects as at least one of lane points at least one of the intersection points between the line image corresponding to the present moment and at least of the two straight lines.

21. The method for detecting lanes of claim 16, wherein in the detecting the first and second candidate pixels further comprising:
excluding, among the first and second candidate pixels thus detected, the pixels which have pixel values different from pixel values of the pixels that correspond to the lane patterns in a previous image frame that corresponds to just before the present moment from the first and second candidate pixels.

22. The method for detecting lanes of claim 16, the first and second candidate pixels further comprising:
detecting the first and second candidate pixels that correspond to the connected groups of the pixels which have the pixel values within a predetermined range and are located within a predetermined distance from the two straight lines, respectively, only if the number of the pixels in the said group is larger than or equal to a threshold value.

23. The method for detecting lanes of claim 16, further comprising:
   converting the said corrected spatiotemporal image to a binarized image; and
   wherein in the detecting two straight lines that correspond to the lane patterns in the at least one corrected spatiotemporal image includes:
   Hough transforming the said binarized image and detecting two straight lines that correspond to the lane patterns in the at least one corrected spatiotemporal image; and detecting the first and second candidate pixels that correspond to the connected groups of the white pixels which are located within a predetermined distance from the two straight lines, respectively.

* * * * *